(12) United States Patent
Onuma

(10) Patent No.: US 11,513,096 B2
(45) Date of Patent: Nov. 29, 2022

(54) ANALYSIS CHIP DEVICE

(71) Applicant: ARKRAY, Inc., Kyoto (JP)

(72) Inventor: Naotsugu Onuma, Kyoto (JP)

(73) Assignee: ARKRAY, INC., Kyoto (JP)

( * ) Notice: Subject to any disclaimer, the term of this patent is extended or adjusted under 35 U.S.C. 154(b) by 42 days.

(21) Appl. No.: 16/534,584

(22) Filed: Aug. 7, 2019

(65) Prior Publication Data
US 2020/0049659 A1 Feb. 13, 2020

(30) Foreign Application Priority Data

Aug. 8, 2018 (JP) .............................. JP2018-149133
Jul. 25, 2019 (JP) .............................. JP2019-136920

(51) Int. Cl.
*G01N 27/447* (2006.01)
*B01L 3/00* (2006.01)

(52) U.S. Cl.
CPC .. *G01N 27/44791* (2013.01); *B01L 3/502715* (2013.01); *B01L 2200/027* (2013.01); *B01L 2300/0645* (2013.01); *B01L 2300/123* (2013.01); *B01L 2400/0406* (2013.01)

(58) Field of Classification Search
CPC ......... G01N 27/44791; B01L 3/502715; B01L 2200/027; B01L 2300/0645; B01L 2300/123; B01L 2400/0406
See application file for complete search history.

(56) References Cited

U.S. PATENT DOCUMENTS

| | | | | | |
|---|---|---|---|---|---|
| 5,932,315 | A | * | 8/1999 | Lum | B29C 65/02 428/172 |
| 2007/0244368 | A1 | * | 10/2007 | Bayloff | G01N 1/02 600/300 |
| 2015/0024436 | A1 | | 1/2015 | Eberhart et al. | |
| 2015/0233865 | A1 | * | 8/2015 | Onuma | B32B 37/12 204/451 |
| 2016/0136646 | A1 | | 5/2016 | Ingber et al. | |
| 2016/0334367 | A1 | * | 11/2016 | Onuma | G01N 27/44743 |
| 2017/0157606 | A1 | | 6/2017 | Kim et al. | |
| 2018/0164247 | A1 | | 6/2018 | Onuma | |

FOREIGN PATENT DOCUMENTS

| | | |
|---|---|---|
| JP | H11-337521 A | 12/1999 |
| JP | 4178653 B | 11/2008 |
| JP | 2016-212090 A | 12/2016 |
| WO | 2008/136465 A1 | 11/2008 |

OTHER PUBLICATIONS

Extended European Search Report issued in corresponding European Patent Application No. 19190322.8 dated Dec. 9, 2019.
Office Action dated Oct. 17, 2022, issued in corresponding European Patent Application No. 19190322.8.

* cited by examiner

*Primary Examiner* — Jennifer Wecker
*Assistant Examiner* — Oyeleye Alexander Alabi
(74) *Attorney, Agent, or Firm* — Morgan, Lewis & Bockius LLP

(57) ABSTRACT

The present disclosure provides an analysis chip device used in capillary electrophoresis.

5 Claims, 5 Drawing Sheets

ANALYSIS CHIP DEVICE

CROSS-REFERENCE TO RELATED APPLICATION

This application claims priority under 35 USC 119 from Japanese Patent Applications No. 2018-149133, filed on Aug. 8, 2018 and No. 2019-136920, filed on Jul. 25, 2019, the disclosure of which is incorporated by reference herein.

BACKGROUND

Technical Field

The present disclosure relates to an analysis chip device used in capillary electrophoresis.

Related Art

Conventional specimen analysis techniques include those based on capillary electrophoresis. Recently, microchip electrophoresis, which uses capillaries adapted for chip devices, has been used to reduce the size and complexity of such devices. In microchip electrophoresis, a single chip is formed with capillaries used for electrophoresis and with holding reservoirs for various types of solutions.

One example of such a microchip is described in JP H11-337521 A, in which the microchip has capillaries formed in a cross shape. Moreover, WO 2008/136465 A1 describes a microchip configured by only a single capillary and solution holding reservoirs at each end thereof. Further, JP 4178653 B describes a microchip provided with film-shaped electrodes.

Furthermore, JP 2016-212090 A discloses a chip unit configured by a microchip (first unit) and a cartridge (second unit). Thereby, a specific liquid contained in the cartridge is moved to the chip, and the chip unit is made complete when the microchip and the cartridge are coupled together.

In aforementioned JP 2016-212090 A, although channels in the microchip and the cartridge are coupled together in a vertical height direction, there is no particular mention of the method of fixing the cartridge and the microchip together. Some sort of fixing method is needed with this chip unit since external force would be applied to an introduction portion when introduced into a measurement device, when positional alignment is performed after this introduction, and when connection is made to electrodes for capillary electrophoresis. In particular, in cases in which a specific liquid such as a diluent or a migration liquid is enclosed on the cartridge side, there is a possibility that the specific liquid might leak and contaminate the measurement device, or a user, upon coupling with the microchip.

SUMMARY

An aspect of the present disclosure is an analysis chip device for used in sample analysis. The analysis chip device comprises a first unit including a sample introduction section through which a sample can be introduced, and an analysis section at which analysis of the sample can be performed, and a second unit including a storage reservoir in which a specific liquid can be enclosed. The first unit includes a first coupling portion and the second unit includes a second coupling portion. The first unit and the second unit can be integrated by the first coupling portion and the second coupling portion being connected, thereby forming a channel for the specific liquid to flow from the storage reservoir to the analysis section. The first coupling portion and the second coupling portion are a combination of a protrusion and a recess having shapes configured to fit together with each other. One of the protrusion or the recess is formed from a material of higher pliability and elasticity than a material of another of the protrusion or the recess. A cross-section of at least a part of the protrusion, along an orthogonal direction to a direction in which the protrusion is configured to be fitted into the recess, is larger than a cross-section of a cavity of the recess, along the orthogonal direction at a location where the part of the protrusion is configured to make contact when the protrusion is fitted in the recess, such that the protrusion or the recess deforms when the protrusion and the recess are fitted together. Thereby, leakage of the specific liquid from a coupled location between the first coupling portion and the second coupling portion is prevented.

An aspect of the present disclosure is an analysis chip device used in capillary electrophoresis. In the analysis chip device, a unit used in sample analysis and a unit enclosing a specific liquid used in the sample analysis are formed as separate bodies, and these units are coupled together to perform sample analysis. Such an analysis chip device enables the coupling to be more simply and more certainly performed, and enables the prevention of leakage of the enclosed specific liquid upon coupling.

BRIEF DESCRIPTION OF THE DRAWINGS

Exemplary embodiments will be described in detail based on the following figures, wherein.

DETAILED DESCRIPTION

Figure 1:
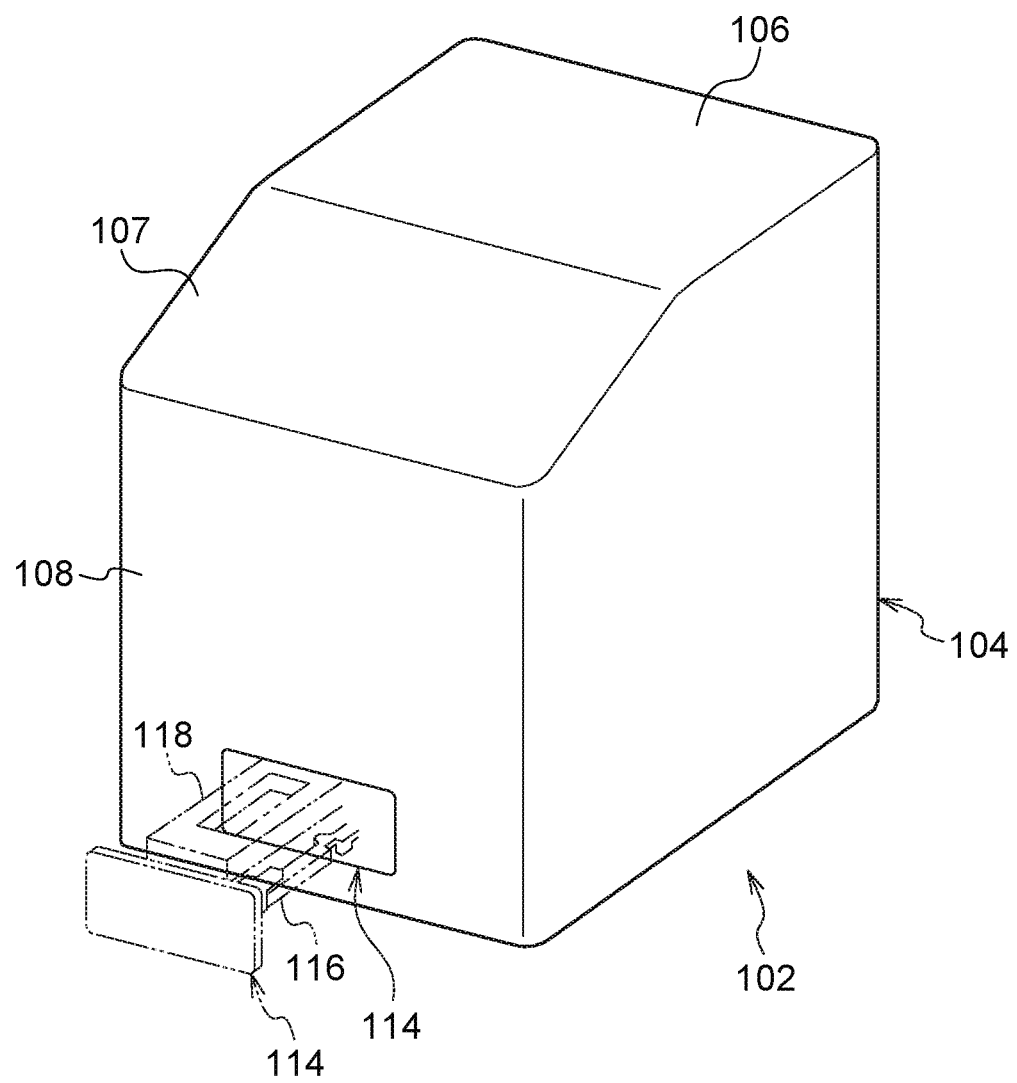
FIG. 1 is a perspective view illustrating an external appearance of an analysis machine of an exemplary embodiment.

A first aspect of the present disclosure is an analysis chip device for used in sample analysis. The analysis chip device comprises a first unit including a sample introduction section through which a sample can be introduced, and an analysis section at which analysis of the sample can be performed, and a second unit including a storage reservoir in which a specific liquid can be enclosed. The first unit includes a first coupling portion and the second unit includes a second coupling portion. The first unit and the second unit can be integrated by a connection of the first coupling portion and the second coupling portion. Thereby, a channel for the specific liquid from the storage reservoir to the analysis section is connected. The first coupling portion and the second coupling portion are a combination of a protrusion and a recess having shapes configured to fit together with each other. One of the protrusion or the recess is formed from a material of higher pliability and elasticity than a material of another of the protrusion or the recess. A cross-section of at least a part of the protrusion, along an orthogonal direction to a direction in which the protrusion is configured to be fitted into the recess, is larger than a cross-section of a cavity of the recess, along the orthogonal direction at a location where the part of the protrusion is configured to make contact when the protrusion is fitted in the recess, such that the protrusion or the recess deforms when the protrusion and the recess are fitted together. Thereby, leakage of the specific liquid from a coupled location between the first coupling portion and the second coupling portion is prevented.

By coupling the first unit and the second unit together, the units configure an integrated analysis chip device for providing sample analysis. When this coupling is performed, the first coupling portion of the first unit and the second coupling portion of the second unit are coupled together, the first coupling portion and the second coupling portion that contribute to this coupling are configured by a combination of a recess and a protrusion, and so coupling is completed by fitting the protrusion into the recess. Furthermore, leaking of the specific liquid from the coupling portion can be prevented due to the recess and the protrusion being airtight when fitted together.

Note that either the first coupling portion or the second coupling portion may be a recess, and that either may be a protrusion, but if one of these coupling portions is a protrusion then the other is a recess. Moreover, one of the recess or the protrusion is formed from a material of higher pliability and elasticity than a material of the other of the protrusion or the recess. Further, a cross-section of at least a part of the protrusion, along an orthogonal direction to a direction in which the protrusion is fitted into the recess, is larger than a cross-section of a cavity of the recess, along the orthogonal direction at a location where the part of the protrusion makes contact when the protrusion is fitted in the recess, such that the protrusion or the recess deforms when the protrusion and the recess are fitted together. Thus, when the recess and the protrusion are being coupled together, the one formed from a material with higher pliability and elasticity is capable of changing in shape to fit the shape of the other, and the protrusion can be inserted into the recess by the change in shape of the one. The coupling is also performed with certainty due to being able to fit the one in close contact with the other under recovery force (restoring force, or restorative force) induced after the change in shape of the one has occurred. The recess and the protrusion thereby achieve an airtight seal as described above, enabling the prevention of contamination a measurement device or a user arising from the specific liquid enclosed in the storage reservoir of the second unit leaking from the coupling portion. In the explanation below "a cross-section of the protrusion, along an orthogonal direction to a direction in which the protrusion is fitted into the recess" is sometimes abbreviated to "a cross-section of the protrusion". Moreover, "a cross-section of a cavity of the recess, along the orthogonal direction" is sometimes abbreviated to "a cavity of the recess".

The extent of the size of the cross-section of the protrusion may be determined by the pliability, elasticity, material, surface friction, and surface profile of both the protrusion and the recess, and also by the relative relationships between these factors and shapes of the recess and the protrusion. Any size may be applied therefor as long as a range of change in shape is achieved that enables the protrusion to be fitted into the recess by change in shape of the material of the one of the protrusion or the recess. For example, achieving higher pliability for the one formed from a material with higher pliability and elasticity enables the protrusion to be fitted into the recess even if the protrusion has a large cross-section (i.e., a cross-section larger than that of the recess). As another example, achieving lower friction between the protrusion and the recess enables the protrusion to be fitted into the recess even if the protrusion has a large cross-section (i.e., a cross-section larger than that of the recess). Furthermore, achieving a closer resemblance between the cross-section shape of the protrusion and the shape of the cavity of the recess enables the protrusion to be fitted into the recess even if the protrusion has a large cross-section (i.e., a cross-section larger than that of the recess). Preferably the cross-section of the protrusion is slightly larger than the cavity of the recess and their shapes resemble each other. Note that the cross-section of the protrusion does not necessarily have to be larger than the cavity of the recess over the entire region where the protrusion and the recess fit together. For example, at least a part of the protrusion, such as only a leading end portion, only an intermediate portion, or just only a base end portion, should be set larger than the cross-section at the location where the part of the protrusion makes contact when being fitted together with cavity of the recess.

In other words, at least at part of an area where the protrusion and the recess actually contact each other in a state in which the protrusion and the recess are fitted together, a cross-section of the protrusion at this part before being fitted together should be larger than a cross-section of the cavity of the recess at this part before being fitted together. Note that, although the cross-section of the protrusion is larger than the cross-section of the cavity of the recess at the location where the protrusion and the recess actually contact each other, it is the material of the one of the protrusion or the recess (namely, the material with a higher pliability and elasticity than that of the other) that is deformed, which may be either the protrusion or the recess. In other words, in cases in which the protrusion is formed from the material of higher pliability and elasticity, the protrusion with the larger cross-section deforms so as to be pressed inward and compressed by the recess. Alternatively, in cases in which the recess is formed from the material of higher pliability and elasticity, the recess deforms so as to be pressed outward by the protrusion with the larger cross-section. In either case, a combination of shapes should be selected to enable an airtight seal of the recess and the protrusion to be achieved, so that the specific liquid enclosed in the storage reservoir of the second unit does not leak from the coupling portion between the protrusion and the recess.

The one material of higher pliability and elasticity than the other means a material that has softness and bendability so that it is deformable in a predetermined deformation amount due to the pliability and elasticity of the material itself, by force applied by the other when the protrusion and the recess are coupled together. Namely, the other material is of lower pliability than the one material (i.e., harder), and so the other material is capable of causing the one material of higher pliability to deform. Furthermore, an airtight seal between the protrusion and the recess can be achieved with certainty due to a direction of the recovery force acting to achieve the airtight seal when the protrusion and the recess are closed up together, even if the one material deforms when the protrusion is fitted into the recess due to its higher elasticity than the other. Note that the material of higher pliability and elasticity may be said to have properties of a higher flexibility or a stronger recovery force. Also note that the deformation means both of deformation due to pliability and deformation due to elasticity.

Note that, when there are plural combinations of first coupling portions and second coupling portions, all of the first coupling portions may be recesses or protrusions, or some of the first coupling portions may be recesses and the others may be protrusions. Thus, in a complementary manner thereto, all of the second coupling portions may be protrusions or recesses, or some of the second coupling portions may be protrusions and the others may be recesses.

The second unit may be positioned above the first unit, and the first coupling portion, as the protrusion, may be formed in the first unit, and the second coupling portion, as the recess, may be formed in the second unit.

The storage reservoir is provided in the second unit as described above, and the second unit is positioned above the first unit. Coupling these units together thereby enables the specific liquid to move quickly under gravity into the analysis section of the first unit. Further, the first coupling portion, as the protrusion, is formed in the first unit, and the second coupling portion, as the recess, is formed to the second unit. The first unit and the second unit are accordingly coupled together by fitting the upward-facing first coupling portion together with the downward-facing second coupling portion.

A bottom portion of the storage reservoir may be formed as the second coupling portion, and the bottom portion of the storage reservoir may be covered by a bottom surface film.

The storage reservoir is provided in the second unit as described above, and the storage reservoir is directly coupled to the first unit side. There is accordingly a need to cover the bottom portion of the storage reservoir with some kind of structure until coupling is completed. The structure is the bottom surface film in the present aspect. Note that the bottom portion of the storage reservoir is formed as the second coupling portion as the recess. This thereby enables the second coupling portion, as the recess, and the first coupling portion, as the protrusion, to be coupled together at the same time as the bottom surface film covering the bottom portion is pierced by the first coupling portion, as the protrusion, of the first unit. This thereby enables a measurement device or a user to be prevented from contamination by splash or leakage of the specific liquid enclosed in the storage reservoir during the coupling of the first unit and the second unit.

Both of the protrusion and the recess may be deformed by pressing when the protrusion is fitted together with the recess.

Although in such a case both the protrusion and the recess deform by pressing when the protrusion is fitted together with the recess as described above, it is natural for the one formed from the material of higher pliability and elasticity deforms by a greater amount.

The recess may be formed from a material of higher pliability and elasticity than a material of the protrusion.

When the protrusion and the recess are fitted together as described above, the one of the protrusion or the recess formed from the material of higher pliability and elasticity deforms more greatly (by a greater amount) due to pressing. In the present case, the recess is formed from the material of higher pliability and elasticity than that of the protrusion, and the cross-section of the protrusion is larger than the cavity of the recess such that the protrusion deforms when the protrusion and the recess are fitted together. This means that the recess is easily made to deform by being pressed outward when the protrusion is fitted therein, and enables the recess to be fitted together in close contact with the protrusion under the recovery force after the recess deforms, such that coupling is performed with certainty. Moreover, forming the first unit including the analysis section from the material that is harder and has lower elasticity facilitates achieving a uniform relative positional relationship between the protrusion and the analysis section, thereby improving the precision of analysis.

Note that the recess may be integrally molded from the same material as the entirety of whichever out of the first unit or the second unit is formed with the recess, or only the recess may be formed from a different material to the other parts thereof using, for example, two-color molding or the like. The protrusion also may be integrally molded from the same material as the entirety of whichever out of the first unit or the second unit is formed with the protrusion, or only the protrusion may be formed from a different material to the other parts thereof using, for example, two-color molding or the like. Anyway, the part to form the recess or the entirety of whichever out of the first unit or the second unit includes the recess is formed from a material of higher pliability and elasticity than the part to form the protrusion or the entirety of whichever out of the first unit or the second unit includes the protrusion.

The one of the protrusion or the recess may be formed from a polypropylene resin, and the other of the protrusion or the recess may be formed from a polymethylmethacrylate resin.

Note that reference to the "one of the protrusion or the recess" in the present case, refers to the one that is formed from the material of a higher pliability and elasticity, and the material is a polypropylene resin. Moreover, "the other" refers to one of the protrusion or the recess that is formed from a material of a lower pliability and elasticity, and the material is a polymethylmethacrylate resin.

For example, the recess may be formed from a polypropylene resin, and the protrusion may be formed from a polymethylmethacrylate resin.

Explanation follows regarding an exemplary embodiment of the present disclosure, with reference to the drawings. An analysis machine of the present exemplary embodiment is, for example, a machine used to analyze the amount of glycated hemoglobin contained in blood. Blood is an example of a sample. Glycated hemoglobin is an example of an analysis subject of the analysis machine. Note that even if not specifically stated, common reference numerals in the drawings represent similar configuration in each of the drawings.

FIG. 1 is a front perspective view illustrating the external appearance of an analysis machine 102 used to carry out an analysis task using an analysis chip device 42 of the present exemplary embodiment. Various mechanisms configuring the analysis machine 102 are loaded inside a casing 104 formed in a substantially rectangular box shape. An operation surface 107 on an upper surface 106 of the casing 104 is configured so as to be downward-sloping toward the side of a front surface 108. The operation surface 107 is provided with a touch panel, not illustrated in the drawings. An operator carrying out an analysis task is able to operate the analysis machine 102 by touching the touch panel while referring to information displayed on the touch panel. The upper surface 106 is further provided with a paper outlet for a printer, not illustrated in the drawings, such that analysis results for the sample can be printed out by the printer.

A sliding cover 114 is provided to the front surface 108 of the casing 104. The sliding cover 114 is capable of sliding between a projecting position (illustrated by double-dotted dashed lines) in which the sliding cover 114 is moved forward by a sliding mechanism 116, and a loaded position (illustrated by solid lines) in which the sliding cover 114 is moved backward and is flush with the front surface 108. When the sliding cover 114 is in the projecting position, a tray 118 accompanies the sliding cover 114 and is exposed at the front side of the casing 104. The analysis chip device 42 containing the sample is placed on the tray 118 when in the projecting position. The tray 118 on which the analysis chip device 42 is placed then retracts to the loaded position in response to operation of the touch panel, so as to set the analysis chip device 42 inside the analysis machine 102 for measurement.

Figure 2:
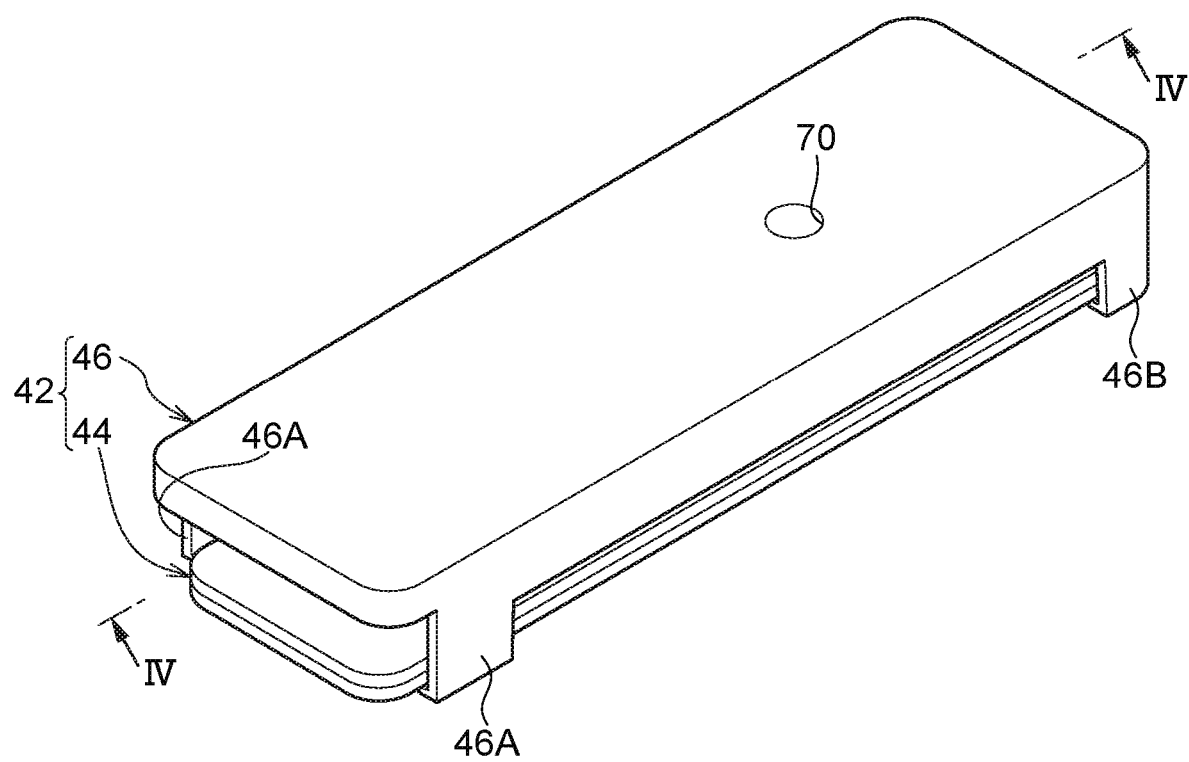
FIG. 2 is a perspective view diagonally from the front illustrating an analysis chip device used in the analysis machine illustrated in FIG. 1.

FIG. 2 is a front perspective view illustrating the analysis chip device 42 of the present exemplary embodiment. The analysis chip device 42 of the present exemplary embodiment has a structure including a first unit 44, serving as a microchip, and a second unit 46 serving as a cartridge. Specifically, the second unit 46 is positioned above the first unit 44, and has a profile configured to clasp the first unit 44 with a pair of front support claws 46A and a pair of rear support claws 46B provided extending downward from the second unit 46.

Figure 3:
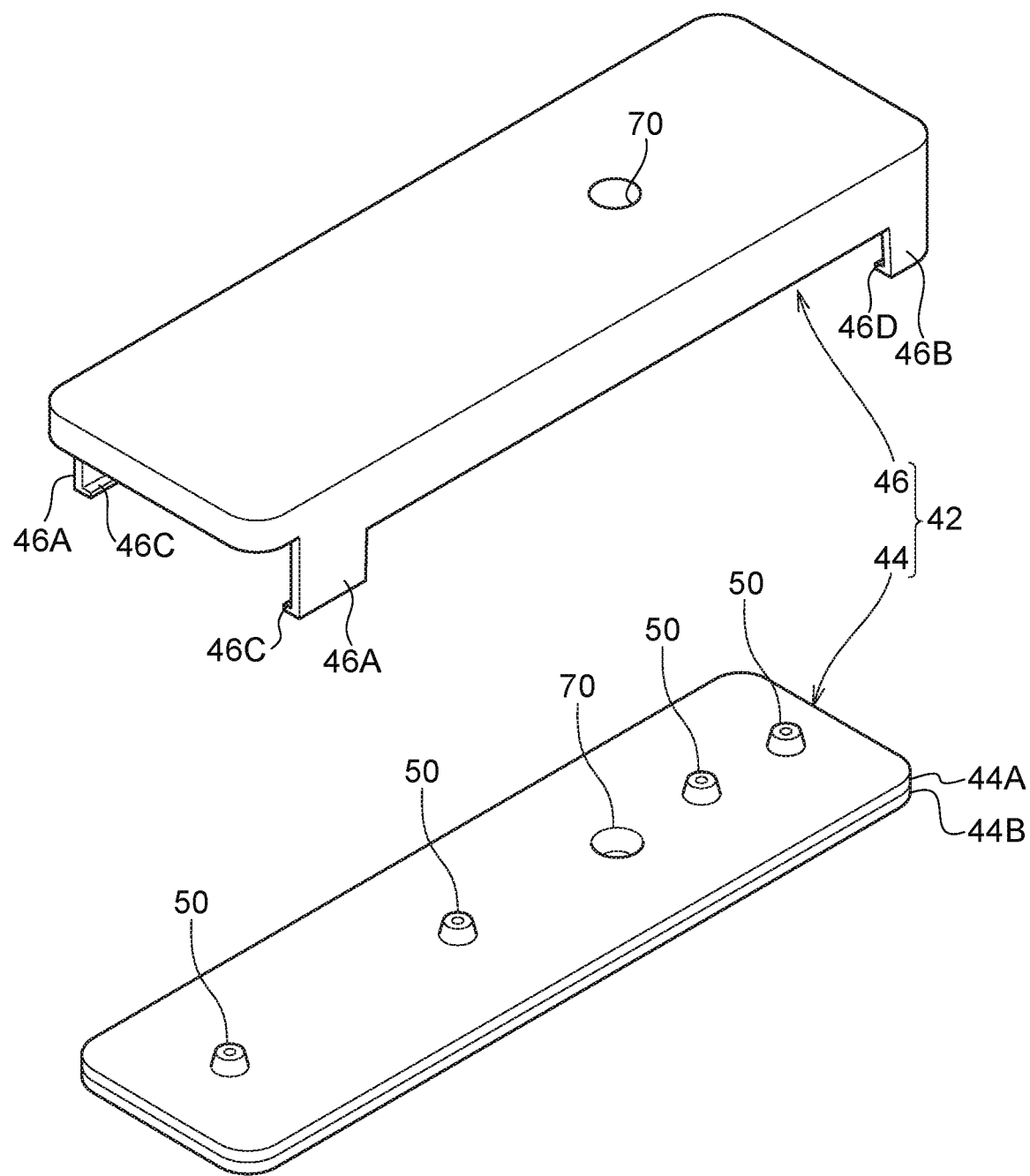
FIG. 3 is an exploded perspective view illustrating the analysis chip device illustrated in FIG. 2.

FIG. 3 is a front perspective view illustrating the analysis chip device 42 in a disassembled state.

As illustrated in FIG. 3, the first unit 44 is a plate shaped member formed by laminating together two plate members (i.e., an upper plate 44A and a lower plate 44B) that have the same external profile as each other in plan view. The upper plate 44A and the lower plate 44B are formed from materials having the same light transmissivity as each other. Examples of these materials include glasses and synthetic resins. Examples of glasses include quartz glass. Examples of light-transmitting synthetic resins include acrylic-based resins, polystyrene-based resins, polycarbonate-based resins, and cycloolefin-based resins.

A top surface of the first unit 44 is formed with four protrusions and a single depression. Each of the four protrusions has a conical frustum shape with a central hole. Each of the protrusions configures a first coupling portion 50. The depression configures an insertion hole 70 described later. Note that the shape of the protrusions does not need to be a conical frustum shape, and they may be formed with a circular column shape or polygonal frustum shape such as a square frustum. In each of the protrusions of the first unit 44 of the present exemplary embodiment, the largest cross-section of the conical-frustum shaped protrusion, along an orthogonal direction to a direction in which the protrusion fits into the recess, is as large as approximately 1.77 mm$^2$ (a diameter of approximately 1.5 mm), which is formed at a bottom plane of the protrusion (i.e., a plane in the same horizontal direction as the top surface of the first unit 44).

The second unit 46 is a member that is superimposed on the first unit 44 from above. Examples of the material used for the second unit 46 include polypropylene-based resins, polyethylene-based resins, other polyolefin-based resins, and silicone-based resins.

For example, in cases in which the first unit 44 is formed from a comparatively hard material such as a glass, and the second unit 46 is formed from a synthetic resin material such as described above, the pliability and elasticity of the second unit 46 is obviously higher than the material of the first unit 44.

In cases in which each of the first unit 44 and the second unit 46 is formed from a synthetic resin, it is not sufficient for the materials that form the first unit 44 and the second unit 46 to be the specific kind of synthetic resins mentioned above. Namely, it is necessary for the synthetic resin that forms the second unit 46 to be of higher pliability and elasticity than the synthetic resin that forms the first unit 44. For example, in cases in which the first unit 44 and the second unit 46 are formed from the same type of synthetic resin (for example, polypropylene), the flexibility of the second unit 46 can be made higher than the pliability and elasticity of the first unit 44 by setting the density of the synthetic resin that forms the second unit 46 lower than the density of the synthetic resin that forms the first unit 44. From this viewpoint, the material of the first unit 44 is preferably a polymethylmethacrylate resin, which is a type of acrylic-based resin, and the material of the second unit 46 is preferably a polypropylene resin. In other words, a level of pliability and elasticity of the materials in the present exemplary embodiment may be understood to be a level of pliability and elasticity exhibited when actually formed into the first unit 44 and the second unit 46.

The second unit 46 is formed with a through hole at the same plan view position as the depression formed in the upper surface of the first unit 44. The through hole configures the insertion hole 70 described later, together with the depression in the top surface of the first unit 44. As described above, the pair of front support claws 46A and the pair of rear support claws 46B are provided extending downward from side surfaces of the second unit 46.

The front support claws 46A are provided extending downward from the side surfaces of the second unit 46, and lower end portions of the front support claws 46A are bent inward to configure front support edges 46C. The rear support claws 46B are provided extending downward in a rounded profile from corner portions between the side surfaces and a back surface of the second unit 46, and lower end portions of the rear support claws 46B are bent inward to configure rear support edges 46D.

The first unit 44 is inserted through between the front support claws 46A into the second unit 46, and the state illustrated in FIG. 2 is achieved by a back surface edge of the first unit 44 abutting the rear support claws 46B. The analysis chip device 42 is set in the tray 118 of the analysis machine 102 when in the state illustrated in FIG. 2. In this state, the first unit 44 is placed on the pair of front support edges 46C and the pair of rear support edges 46D, such that the upper surface of the first unit 44 and the lower surface of the second unit 46 are maintained in a state spaced apart from each other.

Figure 4:
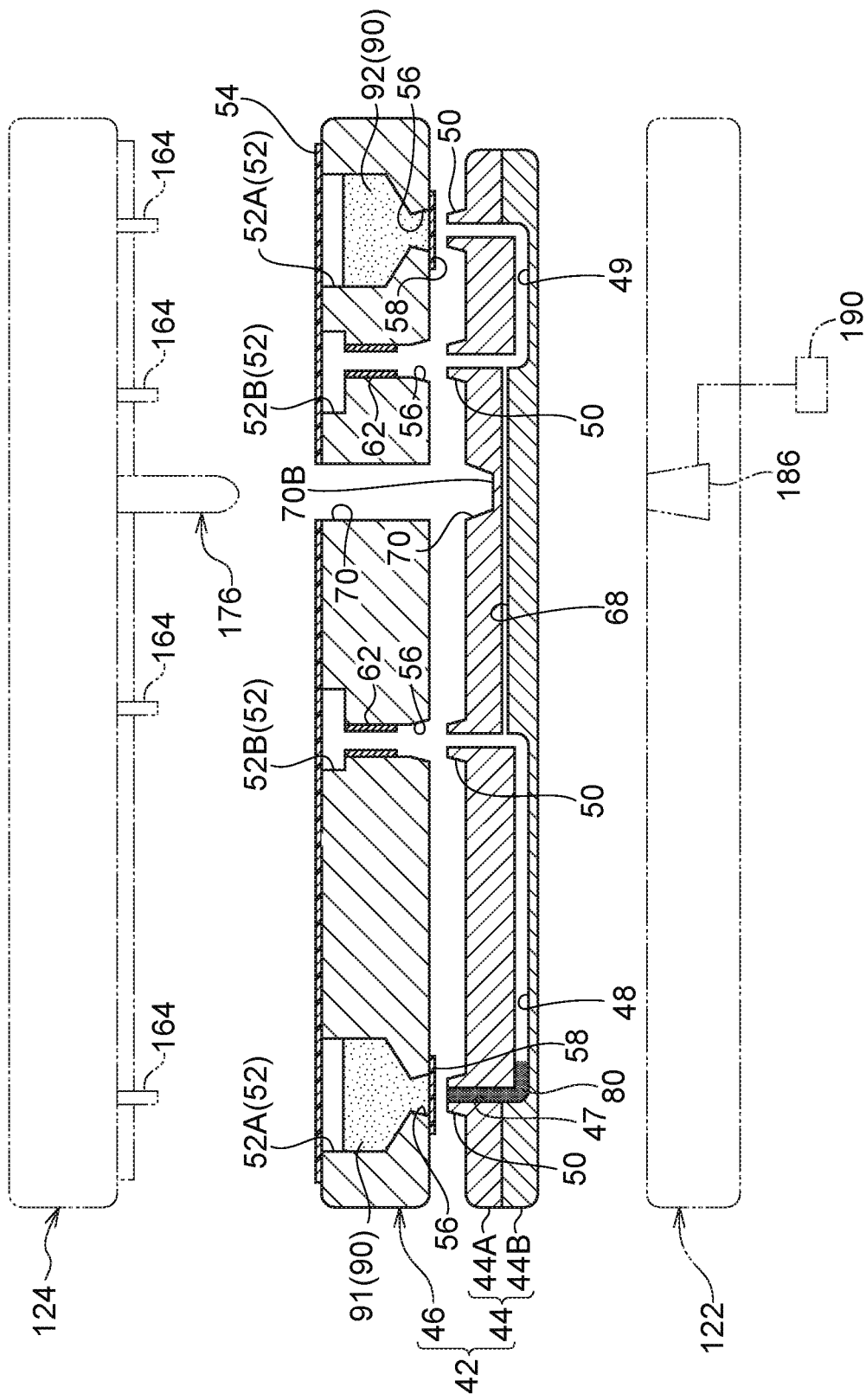
FIG. 4 is a cross-section of the analysis chip device illustrated in FIG. 2 as sectioned along IV-IV.

FIG. 4 illustrates the analysis chip device 42 in a cross-section taken along IV-IV in FIG. 2. Note that a placement portion 122 and a pressing portion 124 are virtually illustrated by double-dotted dashed lines in FIG. 4. When in a loaded state in the analysis machine 102, the placement portion 122 makes contact with the first unit 44 and the pressing portion 124 makes contact with the second unit 46.

The first unit 44 is provided with two channels, namely an upstream channel 48 positioned on an upstream side (on the left in FIG. 4) and a downstream channel 49 positioned on a downstream side (on the right in FIG. 4). The channel cross-section areas of the upstream channel 48 and the downstream channel 49 are set such that when pressure is applied to a liquid by a non-illustrated pump, the pressurized liquid will flow through the channels. Note that the respective cross-section profiles of the upstream channel 48 and the downstream channel 49 and the shapes of the upstream channel 48 and the downstream channel 49 in plan view of the first unit 44 are not limited, and the respective channels may bend at one or plural locations, or may be linear. Note that a sample introduction section 47 onto which a sample 80 (for example blood) is spotted is configured at the uppermost stream of the upstream channel 48.

The first coupling portions 50, serving as the protrusions mentioned above, which project toward the second unit 46, are formed at each end portion of both the upstream channel 48 and the downstream channel 49. Each of the first coupling portions 50 has a conical frustum shape with upwardly decreasing diameter.

The second unit 46 is formed with plural liquid reservoirs 52, configuring upward-opening recesses. Each of storage reservoirs 52A among the liquid reservoirs 52 is a liquid reservoir in which a specific liquid 90 such as a diluent 91 or a migration liquid 92 is enclosed. Namely, the diluent 91 is enclosed in the storage reservoir 52A at an upstream side, and the migration liquid 92 is enclosed in the storage reservoir 52A at a downstream side. Moreover, each of electrode reservoirs 52B among the liquid reservoirs 52 is a liquid reservoir in which an electrode 62 is installed.

Upper surfaces of the liquid reservoirs 52 are sealed off by a sealing film 54. Although, as illustrated in FIG. 4, the plural liquid reservoirs 52 are sealed off by a single sealing film 54 in the present exemplary embodiment, a separate sealing film 54 may be provided for each of the liquid reservoirs 52. The sealing film 54 may use any material that seals and prevents vaporization of the specific liquid 90 enclosed in the storage reservoir 52A, and that is easily pierced by a member with a pointed leading end. Examples of such materials include laminate films having a multi-layered structure including polyethylene terephthalate (PET).

A second coupling portion 56 is formed to a lower portion of each of the liquid reservoirs 52. The second coupling portions 56 each serve as a downward-facing recess into which the corresponding first coupling portion 50 of the first unit 44 is fitted for coupling. Each of the second coupling portions 56 is configured by a conical frustum shaped hole with downwardly increasing diameter, and has a shape complementary to that of the first coupling portion 50. However, the size of the cavities (i.e., holes) of the second coupling portion 56, along an orthogonal direction to the direction in which the first coupling portions 50 fit into the respective second coupling portions 56, is formed slightly smaller than that of the first coupling portions 50. In the second unit 46 of the present exemplary embodiment, the largest cavity of each of the recesses, along an orthogonal direction to a direction in which the protrusion fits into the recess, is as large as approximately 1.65 mm$^2$ (a diameter of approximately 1.45 mm), which is formed at an opening surface of the recess (i.e., a plane in the same horizontal direction as the bottom surface of the second unit 46). Note that each of the second coupling portions 56 may be configured by a shape corresponding to the shape of the corresponding first coupling portion 50, such as by a recess having a circular column shape or a recess having a polygonal frustum shape such as a recess having a square frustum shape. However, the second coupling portions 56 do not necessarily have to have a shape resembling the shape of the corresponding first coupling portions 50, and for example a circular column shaped first coupling portion 50 may be combined with a square frustum shaped second coupling portion 56. A lower portion of the second coupling portion 56 of the storage reservoir 52A in which the specific liquid 90 is enclosed is sealed off by a bottom surface film 58. The material of the bottom surface film 58 may be any material that prevents vaporization of the specific liquid 90 sealed inside the liquid reservoirs 52, that seals so as to prevent, leakage thereof, and that can be easily pierced by the corresponding first coupling portion 50. Examples of such materials include laminate films having a multi-layered structure including PET.

As described above, the largest cross-section of the protrusion of the first coupling portions 50 is approximately 1.77 mm$^2$, and the largest cross-section of the cavity of the recess is approximately 1.65 mm$^2$. Thus, the cross-section of the first coupling portion 50 is approximately 0.12 mm$^2$ larger than that of the cavity of the corresponding second coupling portion 56, meaning that the second coupling portion 56 is formed slightly smaller than the first coupling portion 50. In other words, the cross-section of the protrusion may be said to be formed larger than the cross-section of the cavity of the recess, such that the protrusion deforms when the protrusion and the recess are fitted together. However, as described above, the second unit 46 provided with the second coupling portions 56 is formed from a material of higher pliability and elasticity than a material of the first unit 44 provided with the first coupling portions 50. In other words, each of the second coupling portions 56 has higher pliability and elasticity than the corresponding first coupling portion 50. Accordingly, during coupling of the first coupling portions 50 and the second coupling portions 56, the second coupling portions 56, which are formed from a material of higher flexibility due to its higher pliability and elasticity, are able to deform by a predetermined deformation amount so as to fit the shape of the cross-section of the corresponding first coupling portion 50. Namely, the first coupling portion 50 causes the second coupling portion 56 to deform so as to widen by at least the area of approximately 0.12 mm$^2$ mentioned above in the orthogonal direction to the direction in which the first coupling portion 50 and the second coupling portion 56 are fitted together as the first coupling portion 50 is fitted into the second coupling portion 56. Then after the second coupling portion 56 deforms, a recovery force is induced therein in a direction toward the first coupling portion 50, achieving close contact with the first coupling portion 50. Therefore, the first coupling portion 50 and the second coupling portion 56 are thereby fitted together and achieve an airtight seal, enabling leakage from the coupling portions of the specific liquid enclosed in the storage reservoirs of the second unit to be prevented. In the analysis chip device 42 of the present exemplary embodiment, a force of 196N is applied to fit the first coupling portions 50 into the second coupling portions 56, enabling the first coupling portions 50 and the second coupling portions 56 to be joined together. Note that in cases in which each of the first coupling portions 50 is formed from a material of higher pliability and elasticity than a material of each of the second coupling portions 56, it is each of the first coupling portions 50 that deforms by a predetermined deformation amount so as to fit the shape of the cavity of each of the second coupling portions 56. Then after each of the first coupling portions 50 deforms, a recovery force is induced therein in a direction toward each of the second coupling portions 56, achieving close contact with each of the second coupling portions 56. Each of the first coupling portions 50 and each of the second coupling portions 56 is thus fitted together to form an airtight seal, enabling the specific liquid enclosed in the storage reservoirs of the second unit to be prevented from leaking from the coupling portions. Note that when the first coupling portions 50 are being fitted into the second coupling portions 56, the shape of the cross-section of each of the first coupling portions 50 or the shape of the cavity of each of the second coupling portions 56 deforms by at least the above-described deformation amount so as to enable easy fitting of the first coupling portions 50 into the second coupling portions 56.

Note that the analysis chip device 42 of the present exemplary embodiment described above is merely an example, and upper limits for the respective sizes of the protrusions and recesses are determined by the pliability, elasticity, material, surface friction, and surface profile of both of the protrusions and recesses, and also by the relative relationships of these factors between the recesses and protrusions. Moreover, shapes are selected such that the cross-sections of the protrusions are slightly larger than the cross-sections of the cavities of the recesses so as to achieve easy and certain coupling between the protrusions and recesses, thus enabling leakage of the enclosed specific liquid upon coupling to be prevented. In the case of the analysis chip device 42 of the present exemplary embodiment, the cross-section of each of the protrusions is preferably 0.01 mm$^2$ to 1.00 mm$^2$ larger than the cross-section of the cavity of the respective recess, and is more preferably 0.1 mm$^2$ to 0.5 mm$^2$ larger than the cross-section of the cavity of the recesses.

A capillary serving as an analysis section 68 is formed between the upstream channel 48 and downstream channel 49. The channel cross-section area of the analysis section 68 (namely, the cavity size along a direction orthogonal to a flow direction) is set such that the liquids present in the upstream channel 48 and the downstream channel 49 flow as a result of capillary action. The channel cross-section area of the analysis section 68 is accordingly smaller than both the channel cross-section area of the upstream channel 48 and the channel cross-section area of the downstream channel 49. The electrodes 62 are also provided at the electrode reservoirs 52B as the liquid reservoirs 52 positioned on either side of the analysis section 68. A power supply probe, not illustrated in the drawings, inserted through a non-illustrated hole provided in a side surface of the second unit 46 is in contact with each of the electrodes 62. A voltage is thus applied across the electrodes 62.

As described above, the insertion hole 70 is formed at the same plan view position in both the first unit 44 and the second unit 46. The part of the insertion hole 70 provided in the first unit 44 is formed in an inverted conical frustum shape and includes a hole bottom 70B. The hole bottom 70B penetrates through to the vicinity of an intermediate region of the analysis section 68. The part of the insertion hole 70 provided to the second unit 46 penetrates through the second unit 46.

The placement portion 122 is a member on which the first unit 44 is placed inside the analysis machine 102. A light measurement sensor 186 is provided to the placement portion 122 at a position located in the vicinity of the above insertion hole 70 when the analysis chip device 42 is at the loaded position (see FIG. 1) inside the analysis machine 102. A signal obtained by the light measurement sensor 186 is used to compute optical absorbance in measurement section 190.

The pressing portion 124 is a member positioned above the second unit 46 inside the analysis machine 102. An illumination section 176 is provided projecting downward from the pressing portion 124 at a position directly above the insertion hole 70 in a state in which the analysis chip device 42 is at the loaded position inside the analysis machine 102 (see FIG. 1). The illumination section 176 is a member that illuminates light from its leading end onto the liquid subject to electrophoresis in the analysis section 68. The pressing portion 124 is further formed with downward-facing piercing pins 164 at positions corresponding to the respective liquid reservoirs 52.

Figure 5:
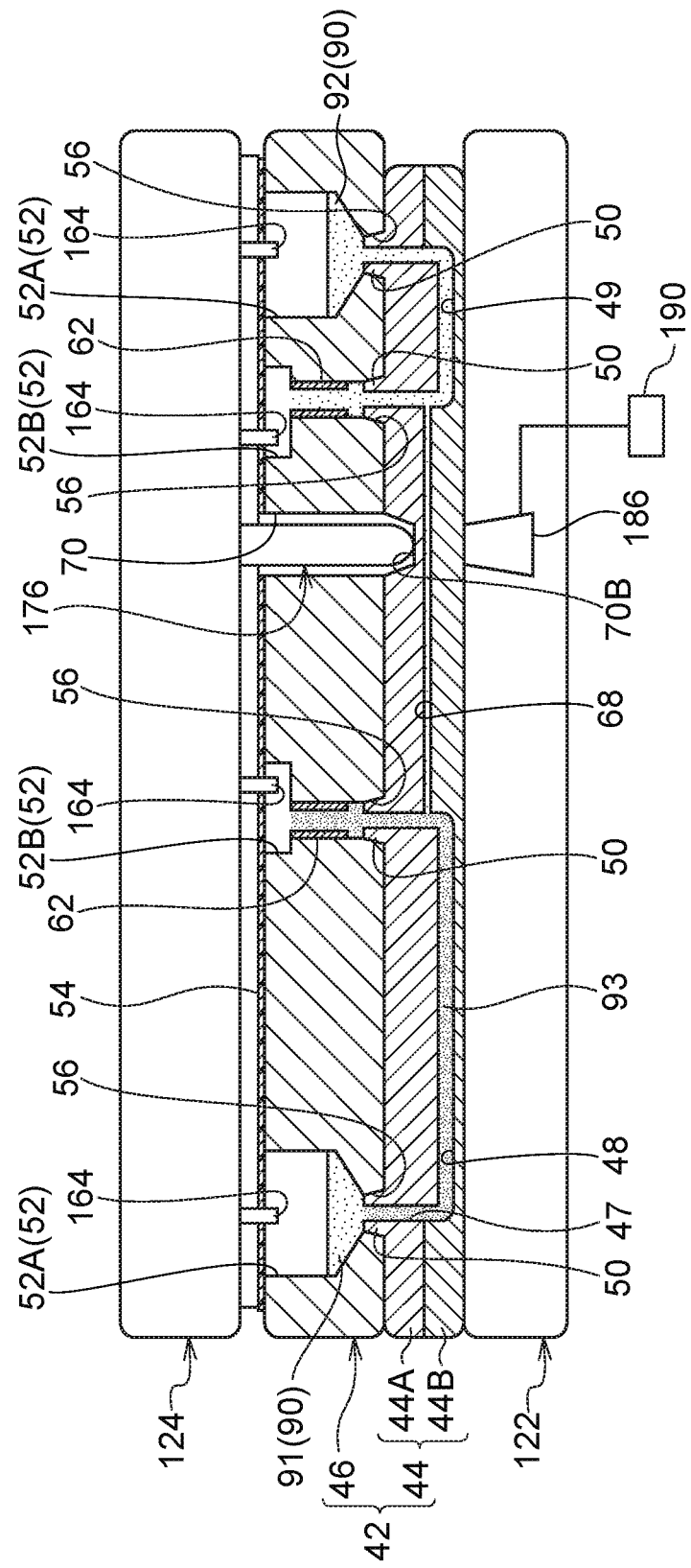
FIG. 5 is a cross-section illustrating an in-use state of the analysis chip device illustrated in FIG. 4.

Immediately after the analysis chip device 42 is moved from the projecting position to the loaded position as described above, the analysis chip device 42 lies on the placement portion 122 in a state in which the first unit 44 and the second unit 46 are spaced apart from each other, as illustrated in FIG. 4. When, from this state, the pressing portion 124 then presses the second unit 46 from above, the second unit 46 is pressed against the first unit 44 so as to adopt the state illustrated in FIG. 5. The following three concurrent events take place when this occurs.

Firstly, the first coupling portions 50 of the first unit 44 are fitted into the second coupling portions 56 of the second unit 46. The recesses configuring the second coupling portions 56 are holes that widen on progression downward, whereas the protrusions configuring the first coupling portions 50 are projections with upwardly decreasing diameters. The first coupling portions 50 are accordingly easily inserted into the corresponding second coupling portions 56 from below. Moreover, as described above, the second coupling portions 56 are formed from a material of higher pliability and elasticity than a material of the first coupling portions 50. Each of the first coupling portions 50 of the first unit 44 is also larger in the orthogonal direction to the direction in which the first coupling portions 50 are fitted into the second coupling portions 56 than each of the cavities of the second coupling portions 56 along the orthogonal direction, to the extent that each of the first coupling portions 50 is fitted into each of the second coupling portions 56 by deformation of the material of the second coupling portions 56. Accordingly, each of the second coupling portions 56 more readily deforms than each of the first coupling portions 50 when each of the first coupling portions 50 is pressed to fit therein, and each of the first coupling portions 50 and each of the second coupling portions 56 is coupled together tightly by the recovery force induced thereby. When this is occurring, each of the first coupling portions 50 corresponding to each of the storage reservoirs 52A puncture each of the bottom surface films 58. Accompanying this, in the upstream storage reservoir 52A containing the diluent 91 as the specific liquid 90, the diluent 91 flows into the upstream channel 48, and the sample 80 spotted in the sample introduction section 47 is diluted by the diluent 91 to form a diluted sample 93. The diluted sample 93 fills the upstream channel 48 and arrives at the upstream electrode reservoir 52B. Meanwhile, in the downstream storage reservoir 52A containing the migration liquid 92 as the specific liquid 90, the first coupling portion 50 punctures the bottom surface film 58 such that the migration liquid 92 similarly flows into the downstream channel 49, so as to arrive at the downstream electrode reservoir 52B and to also fill the analysis section 68.

Secondly, the respective piercing pins 164 provided to the pressing portion 124 pierce the sealing film 54 at the corresponding liquid reservoirs 52. This enables pressure to be applied to the liquids therein using a non-illustrated pump through the holes formed by this piercing.

Thirdly, the parts of the insertion hole 70 provided to the first unit 44 and the second unit 46 are integrated together into a single unit to form a single bottomed hole. The illumination section 176 provided to the pressing portion 124 is inserted into the insertion hole 70 from above until it contacts the hole bottom 70B.

Coupling the first coupling portions 50 and the second coupling portions 56 together in the state described above integrates the first unit 44 and the second unit 46 together and connects together the channels for the specific liquid 90 from the respective storage reservoirs 52A to the analysis section 68. The diluted sample 93 and the migration liquid 92 are thereby filled between the two electrodes 62, and a predetermined voltage is applied across the two electrodes 62 by the non-illustrated power supply probes, starting the electrophoresis of the diluted sample 93 that is contiguous from the upstream channel 48 to the analysis section 68. When this occurs, the second coupling portions 56 of higher pliability and elasticity deform due to the first coupling portions 50 being pressed and fitted therein from below. An airtight seal is accordingly achieved between each of the second coupling portions 56 and each of the first coupling portions 50, preventing the specific liquid 90 from leaking out from these coupled locations.

The diluted sample 93 migrating in the analysis section 68 is, when passing beneath the insertion hole 70, illuminated with light from above by the illumination section 176. Predetermined wavelength components of the illuminated light are absorbed by the diluted sample 93. The remaining wavelength components are sensed by the light measurement sensor 186 and converted into a predetermined signal. This signal is then converted by the measurement section 190 into a numerical value as optical absorbance.

What is claimed is:

1. An analysis chip device for used in sample analysis, the analysis chip device comprising:
   a first unit including a sample introduction section configured to introduce a sample, an analysis section configured to analyze the sample, and a protrusion shaped into a frustum extending upwardly from a top surface of the first unit, the protrusion having a surface formed with a hole and a channel inside the protrusion connecting the hole to the analysis section; and
   a second unit disposed at an upper side of the first unit and including a first bottom surface with an opening and a storage reservoir having a second bottom surface formed with a film sealing the opening of the first bottom surface, the storage reservoir being capable of enclosing a specific liquid, wherein a shape of a cross-section of the frustum along a horizontal direction and a shape of the opening are similar, wherein:
   the first unit and the second unit are integrable by the protrusion being inserted into the storage reservoir through the film, thereby the protrusion puncturing the film, the protrusion and an inner face of the opening fitting together with each other, and the first unit and the second unit forming a channel for the specific liquid to flow from the storage reservoir to the analysis section through the hole,
   the protrusion is formed from a material of higher elasticity than a material of the opening, or the opening is formed from a material of higher elasticity than a material of the protrusion, and
   a cross-section of at least a part of the frustum, along the horizontal direction, is larger than the opening,
   wherein the protrusion is formed from a polyproplyene resin and the opening into which the protrusion is inserted is formed from a polymethylmethacrylate resin, or the protrusion is formed from a polymethylmethacrylate resin and the opening into which the protrusion is inserted is formed from a polypropylene resin.

2. The analysis chip device of claim 1, wherein both of the protrusion and the opening are configured to be deformed by pressing when the protrusion is fitted together with the opening.

3. The analysis chip device of claim 1, wherein the opening is formed from a material of higher elasticity than a material of the protrusion.

4. The analysis chip device of claim 1, wherein a material of the protrusion is different from that of the first unit.

5. The analysis chip device of claim 1, wherein a material of the opening is different from that of the second unit.

\* \* \* \* \*